United States Patent [19]

Sakamoto et al.

[11] Patent Number: 4,943,759
[45] Date of Patent: Jul. 24, 1990

[54] MULTIPLE-ARTICULATED ROBOT CONTROL APPARATUS

[75] Inventors: Keiji Sakamoto, Hachioji; Osamu Yoshida, Oshino, both of Japan

[73] Assignee: Fanuc Ltd., Minamitsuru, Japan

[21] Appl. No.: 305,869

[22] PCT Filed: Jun. 17, 1988

[86] PCT No.: PCT/JP88/00604
§ 371 Date: Jan. 27, 1989
§ 102(e) Date: Jan. 27, 1989

[87] PCT Pub. No.: WO88/10452
PCT Pub. Date: Dec. 29, 1988

[30] Foreign Application Priority Data

Jun. 18, 1987 [JP] Japan ............... 62-150205

[51] Int. Cl.$^5$ .................. G05B 5/00
[52] U.S. Cl. ................ 318/568.11; 318/565; 318/563; 318/434; 318/625; 364/513
[58] Field of Search ............ 318/565-574, 318/608, 610, 612, 618, 619, 632, 634, 628, 627, 626, 629, 634, 635, 636; 364/513; 901/9, 3, 19, 20, 23, 24

[56] References Cited

U.S. PATENT DOCUMENTS

| | | | |
|---|---|---|---|
| 4,200,925 | 4/1980 | Cushman | 318/636 X |
| 4,260,942 | 4/1982 | Fleming | 318/565 |
| 4,547,858 | 10/1985 | Horak | 318/568.11 |
| 4,712,052 | 12/1987 | Omae et al. | 318/625 |
| 4,772,830 | 9/1988 | Kobari et al. | 318/565 X |
| 4,807,153 | 2/1989 | Onaga et al. | 318/563 X |
| 4,814,678 | 3/1989 | Omae et al. | 318/434 X |

Primary Examiner—William M. Shoop, Jr.
Assistant Examiner—Paul Ip
Attorney, Agent, or Firm—Staas & Halsey

[57] ABSTRACT

A multiple-articulated robot control apparatus eliminates robot arm vibration by feedback-compensating disturbance due to interference torque when the robot arms are driven. The apparatus includes an arithmetic circuit (8) for computing mutual interference torque values for respective ones of the arms, a status observing circuit (2) for reproducing a status variable from a torque command and actual velocity of each servomotor, a conversion circuit (4) for converting an output of the status observing means into a corrective value of torque produced by disturbance acting upon the servomotor, and a correcting circuit (9) for correcting an error signal of the torque command of the servomotor by the converted corrective value and the interference torque value. Disturbance of each arm with regard to driving torque is eliminated. The apparatus is adapted to correct estimated disturbance torque.

2 Claims, 2 Drawing Sheets

MULTIPLE-ARTICULATED ROBOT CONTROL APPARATUS

BACKGROUND OF THE INVENTION

This invention relates to a multiple-articulated robot control apparatus for eliminating robot arm vibration by effecting feedback compensation of disturbance due to interference torque when the robot arm is driven.

An ordinary variable program robot possesses feedback controllers which move the joints of a manipulator from a present value to a designated target value. In accordance with these controllers, the effect which motion along one axis has on other axes is regarded as disturbance in the feedback control system without producing a model of the detailed dynamics of the mutually interfering joints when deciding an actuator signal.

FIG. 3 is a block diagram of a feedback control system. In order to compensate for accumulation of the error due to the abovementioned disturbance on a real-time basis, actual motion is measured, an output from an arm servomotor a serving as a plant is compared with a target response and is subjected to computations by a control rule b having a predetermined feedback gain with respect to the error, and the input to the plant is varied dynamically. However, in a case where a torque signal for the arm required for a robot activity is applied to a multiple-articulated robot as the abovementioned actuator signal, the torques for the respective axes generated as the actual response interfere with one another. The arm vibration thus brought about includes frictional and gravitational forces having non-linear components. In particular, in terms of eliminating path error in a welding operation or the like, it is essential that these be accurately determined.

With regard to arm vibration caused when each arm is feedback-controlled by such a joint driving servomotor, the conventional practice is, say, to compute each axial torque based on a movement command along each axis and correct the torque signal applied to the arm.

The abovementioned feedback control rule requires realtime computation. Though each servomotor provides feedback with regard to a velocity signal in such case, an acceleration signal cannot be obtained unless a position command signal along each axis is differentiated twice. Further, in a conventional control method in which a torque value is computed from this acceleration and velocity, about 16 ms of time is required as the computation period. Accordingly, a problem encountered is that vibration components having high frequencies cannot be removed.

SUMMARY OF THE INVENTION

The present invention has been devised in order to solve the foregoing problems and its object is to provide a multiple-articulated robot control apparatus in which an interference torque value, which causes robot arm vibration is computed at high speed along each axis, thereby making it possible to positively eliminate arm vibration.

According to the present invention, there can be provided a control apparatus for a multiple-articulated robot in which each arm is independently driven by a feedback-controlled joint driving servomotor, comprising arithmetic means for computing mutual interference torque values for respective ones of the arms, status observing means for reproducing a status variable from a torque command and actual velocity of each servomotor, conversion means for converting an output of the status observing means into a corrective value of torque produced by disturbance acting upon the servomotor, and correcting means for correcting an error signal of the torque command of the servomotor by the converted corrective value and the interference torque value, whereby disturbance of each arm with regard to driving torque is eliminated.

Accordingly, the multiple-articulated robot control apparatus of the present invention is such that an interference torque value is decided from a torque command along each axis, a disturbance torque acting non-linearly upon the feedback system of each axis is estimated by the status observing means, and these disturbance torques are employed as compensating torques along the respective axes with regard to erroneous commands in the velocity loop. In this way interference torque values which cause robot arm vibration are subjected to feedback compensation so that arm vibration can be positively eliminated.

DESCRIPTION OF THE PREFERRED EMBODIMENT

An embodiment of the present invention will now be described in detail with reference to the drawings.

Figure 2:
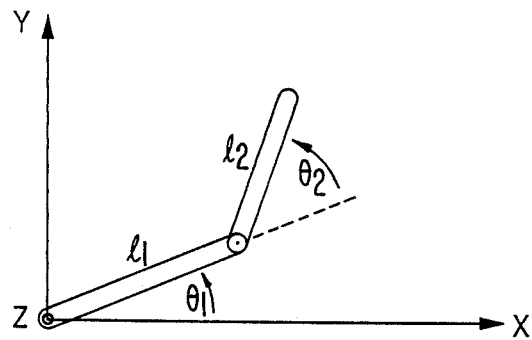
FIG. 2 is a schematic view of a two-link planar manipulator having rotating joints.
Figure 3:
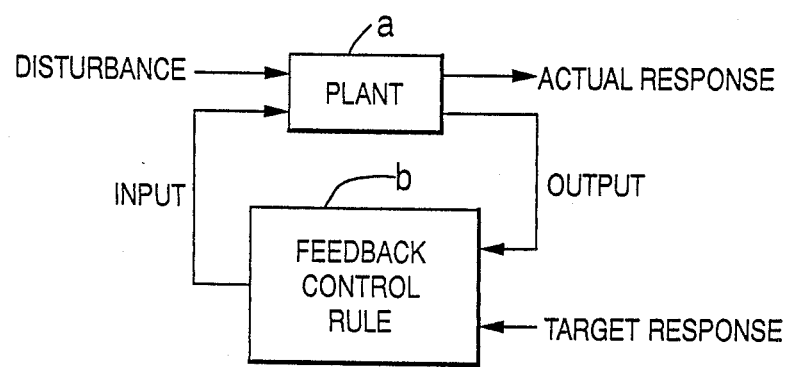
FIG. 3 is a block diagram of a feedback control system.

FIG. 2 is a schematic view of a two-link planar manipulator having rotational joints. It is possible to expand and apply the particulars described hereinbelow regarding the abovementioned manipulator to a multiple-articulated robot having multiple joints. A first arm $l_1$ and a second arm $l_2$ have two joints the positions of which can be defined by angles $\theta_1$ and $\theta_2$, and the axis of each joint is parallel to the Z axis. That is, the arm of the abovementioned robot is assumed to move in the X-Y plane.

These joints are arranged so as to be capable of being driven simultaneously by the respective servomotors. The torques generated thereby interfere with one another and cause the arm to vibrate. A disturbance torque $h(\theta,\dot{\theta})$ which acts upon the arm of the robot can in general be expressed as follows based on a manipulator motion equation:

$$T = M(\theta)\ddot{\theta} + V\dot{\theta} + h(\dot{\theta},\theta) + g(\theta)$$

Let us consider only dynamic torque caused by actualization of motion, with the term g due to gravity and the term V due to friction being eliminated.

As the dynamic torques, an inertial matrix is indicated by $M(\theta)$, and other dynamic torques are indicated by $h(\theta,\dot{\theta})$. If $M(\theta)$ is a regular matrix, then velocity can be expressed by the following equation:

$$\ddot{\theta} = M^{-1}(\theta)T - M^{-1}(\theta)\cdot h(\theta,\dot{\theta})$$

There are three types of dynamic torques considered as disturbance torques that act so as to cause arm vibration. One is inertial torque proportional to joint acceleration, one is centripedal torque proportional to the square of the joint angular velocity, and one is Coriolis torque proportional to the product of joint velocities from the two different links.

The inertial torque arises from an ordinary action/reaction force when the arm is accelerated, and the centripedal torque arises from rotation constrained about a certain center. For example, the forearm is constrained to rotate about the shoulder joint, so that a centripedal force is produced along the first arm $l_1$ in the direction of the shoulder joint. The Coriolis torque is a vortex-like force produced with interference between the two rotational systems as the cause.

Figure 1:
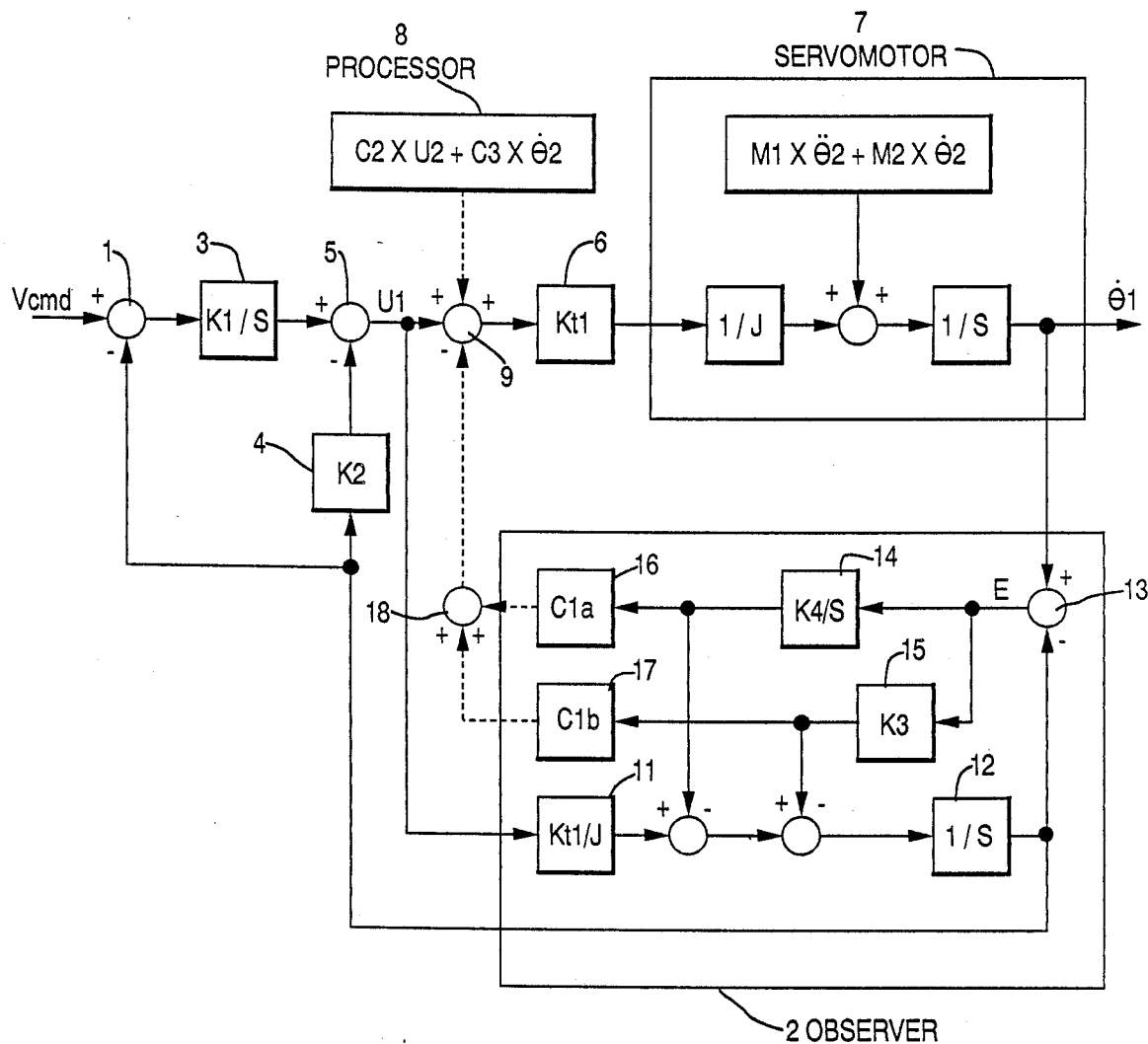
FIG. 1 is a block diagram of an embodiment of a multiple articulated robot control apparatus according to the present invention.

Besides interference torques caused by these dynamic torques generated at the time of drive, disturbance torque due to friction and gravity must be computed in order to accurately decide the parameters of the servomotors for the respective axes. Accordingly, in the present invention, an observer of the first axis ($\dot{\theta}_1$) is constructed as shown in FIG. 1, whereby an estimation of velocity is performed by the observer with regard to the servomotor of the first axis, assuming that the first axis of the robot is driven at the same time as the second axis.

In this servo system, first an error between a commanded velocity Vcmd and the output of an observer 2 is obtained by an adder 1. The output of an element 3, which multiplies the error by a loop gain $K_1$ and then performs integration, and the output of an element 4 for a velocity loop gain $K_2$, are added by an adder 5 to form a torque command $U_1$. The torque $U_1$ obtained is input to a torque constant element 6 of a specific inertial matrix and then applied as a command signal to a servomotor 7, which is the object under control. A servomotor control processor 8 provided for each axis performs the computation $$C_2 \times U_2 + C_3 \times \dot{\theta}_2$$

as a corrective torque which includes a corrective term $h(\theta, \dot{\theta})$ conforming to the non-linear torque component acting on the arm, and components $C_2$ and $C_3$ of the inertial matrix $M(\theta)$. This is added to the torque command $U_1$ in an adder 9. Here $U_2$ is a torque command for the servomotor of the second axis.

An interference torque $$M_1 \times \ddot{\theta}_2 + M_2 \times \dot{\theta}_2$$

stipulated by the velocity $\dot{\theta}_2$ and acceleration $\ddot{\theta}_2$ of the arm of the second axis acts as disturbance upon the first axis servomotor 7, which is under control. Here $M_1$ and $M_2$ are interference torque coefficients.

The observer 2 for this servo system is composed of elements similar to those of the servomotor 7 and is adapted to multiply an error E with actual velocity by a predetermined coefficient and add the result to the torque command $U_1$.

More specifically, in the observer 2, the torque command $U_1$ is converted into an acceleration value by a constant term 11 corresponding to inertia. This value is converted into a velocity value by an integration element 12. The error E is calculated by an adder 13 from the velocity value from the integration element 12 and the actual velocity $\dot{\theta}_1$ of the servomotor 7, and a steady error component is eliminated by elements 14 and 15 having observer gains $K_3$ and $K_4$. With regard to a non-steady error component, addition is performed by an adder 18 via elements 16 and 17 having corrective torque coefficients $C_{1a}$ and $C_{1b}$. The result is added to the torque command $U_1$ by the adder 9.

In other words, due to a non-steady error component caused by non-linear disturbance, the error E between the output of the observer 2 and the actual velocity $\dot{\theta}_1$ of the servomotor 7 will not become zero even if all of the set parameters of the servo system are accurate and the disturbance torque also is correctly computed along each axis. Therefore, the disturbance due to interference is removed and a corrective value is added to the disturbance torque estimated by the observer. In this way it is possible to reduce vibration due to interference among the arms of a multiple-articulated robot.

Though an embodiment of the present invention has been described, the invention is not limited thereto but can be modified in a variety of ways without departing from the scope of the claims.

The control apparatus for a multiple-articulated robot according to the present invention is adapted to estimate disturbance torque by an observer and add a corrective torque thereto in order to reduce arm vibration of the multiple-articulated robot.

We claim:

1. A control apparatus for a multiple-articulated robot in which each arm is independently driven by a feedback-controlled joint driving servomotor, comprising:
    arithmetic means for computing mutual interference torque values for respective ones of the arms;
    status observing means for reproducing a status variable from a torque command and actual velocity of each servomotor, said status observing means including:
        constant term means for receiving an acceleration value and converting it to a constant term;
        integration means, connected to said converting means, for receiving and converting the constant term value to a velocity value;
        a first adder, connected to the servometer and said integration means, for calculating an error having a steady component and a non-steady component;
        error elimination means, connected to said first adder, for eliminating the steady error component; and
        torque means, connected to said error elimination means, for providing corrective torque to the non-steady error component from said error elimination means;
    a second adder, connected to said corrective means, for adding the outputs from said torque means;
    conversion means, connected to said status observing means, for receiving the velocity value from said integration means and for converting an output of the status observing means into a corrective value of torque produced by disturbance acting upon the servomotor; and
    correcting means, connected to said conversion means and said second adder, for receiving the output from said second adder and the corrective value and for correcting an error signal of the torque command of the servomotor by the converted corrective value and said interference torque value.

2. A control apparatus for a multiple-articulated robot according to claim 1, wherein said arithmetic means comprises a microcomputer.

* * * * *